Dec. 3, 1935.   C. ROTH   2,023,291
BUTTER CHIP MACHINE
Filed Aug. 12, 1932
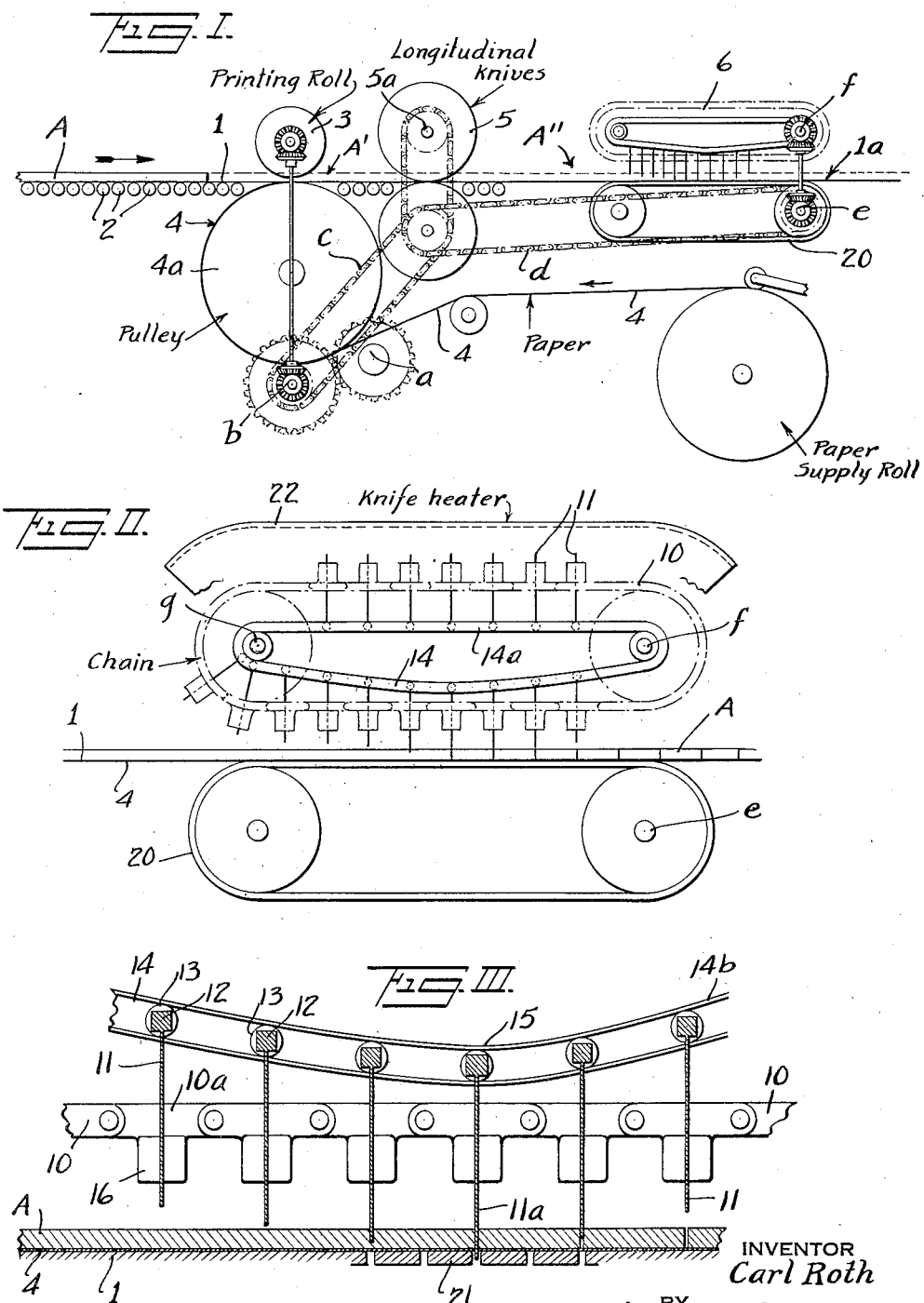

Patented Dec. 3, 1935

2,023,291

UNITED STATES PATENT OFFICE 2,023,291

BUTTER-CHIP MACHINE

Carl Roth, Astoria, N. Y., assignor to Henry N. Oetjen, New York, N. Y.

Application August 12, 1932, Serial No. 628,511

7 Claims. (Cl. 31—5)

This invention relates to machines for imprinting sheet butter so as to form what are known in the trade as butter chips.

Particular features of the invention involve the movement of a sheet or slab of butter of the required thickness, fed steadily through a machine and under a series of knives, which cut transversely through the slab of butter, operating automatically in conjunction with other knives forming the longitudinal cutting of the butter slab.

In particular, this invention relates to having the knives forming the transverse cuts so arranged that they move at the same speed as the butter slab on a feed of paper which forms the base of the slab, and after the butter chips have been formed the paper serves for the wrapping, ready for the predetermined quantity of butter in chip form to be delivered to the trade. In conjunction with these knives there is a severing knife, such as every seventh transverse knife having a slightly greater extension, so that when it contacts with the butter it cuts through, and in addition cuts through the paper base, so that complete sections of the predetermined size leave the machine on the paper base already to be wrapped and shipped.

The machine so embodying my coordinated and automatically controlled transverse severing knives, provides for the movement of a butter slab continuously and at a high speed compared with any machine heretofore. There has been a machine which imprinted butter chips, but thereafter formed the slabs at the rate of approximately six pounds of finished product per minute, but in comparison therewith my machine working through a continuous operation produces the product in perfect condition for trade use, and completes the finished product to the extent of fifty or sixty pounds per minute. From this it will be seen that my machine represents a utility in efficient production in the neighborhood of ten times what has heretofore been available for any similar purpose to the butter trade.

While I have made various designs and constructed various features of my machine, in different ways, a completed most successfully operating machine is illustrated in the accompanying drawing and will hereinafter be described in detail.

In the accompanying drawing forming a part hereof, I show an embodiment of my invention:

Fig. I is a side elevation, diagrammatic view, of a machine embodying my invention.

Fig. II is a side elevation of the structure, on an enlarged scale, containing my invention, for transversely severing the butter slab by continuous operation at high speed.

Fig. III is a vertical section on a still more enlarged scale, of the transverse cutting knives as mounted in the continuously moving structure.

In Fig. I a butter slab A rests on a table 1. At the entrance where the butter slab is delivered and moves in the direction of the arrow, it may be supported on rollers 2 and passes under the butter chip printing roll 3, while the pressure is supported on the pulley 4, which at the same time feeds a paper under the surface of the butter, that is between the butter and the table, which paper is supplied by a roll, of a suitable quality such as waxed paper, and fed over guide rolls with any suitable tensioning roll or devices. The butter then passes at A' under a series of longitudinally cutting knives 5, and at A'' the butter on the paper reaches the transverse cutting mechanism 6. As it passes through this cutting mechanism, the imprint of roll 3 having marked the dimensions of the butter chips, the knives on mechanism 6 are so arranged that synchronized with the printing rolls they cut the butter slab transversely, in order to sever the chips while still leaving them together on the paper base. As the size of the butter slabs and the number of chips are intended to provide an exact commercial quantity, such as a half pound for the package delivered in the trade, the transverse butter severing mechanism has in addition an arrangement of one transverse knife that severs the butter, and in addition projects through the paper base. This will be noted from Fig. III in which knife 11ª is designated as severing the paper and is longer than the other knives 11—11. For example, on each seventh row of chips the slab and paper are severed, thus cutting completely away each approximate half pound of butter. After each finished block of chips leaves the transverse knife mechanism 6 it is automatically projected on the table at 1ª, as finished product, such as a half pound of butter chips on a paper base with the surplus paper necessary to turn over, either by hand or automatically, thereby completing the half pound package of butter chips ready for delivery to the trade.

The general mechanism may be driven as by a jack-shaft $a$ turning the pulley 4ª, and with suitable gears driving the shaft $b$ which with bevel gears drives the shaft of the printing roll 3, and by chain $c$ drives another shaft, which in turn drives shaft 5ª for the longitudinal cutting knives, and through a chain d drives the shaft e, and by bevel gears drives the shaft f of the transverse knife cutting mechanism. The driven pulley pulls the paper 4 off the roll with suitable resistance to assure even movement with the speed of all of the coordinated parts. The driving mechanism of gears or chains are so arranged that the printing roll 3 compresses the butter slab to any degree desired, and then feed the imprinted slab through the longitudinal knives 5 and into the transverse cutting knife mechanism 6, which is adjusted so that the transverse knives register exactly with the transverse creases impressed upon the slab by the printing roll.

In Fig. II the transverse cutting knife mechanism 6 is shown in side view on an enlarged scale, in which the shaft f and the shaft g support sprockets at their ends, each pair of sprockets having a chain 10 passing around them with its lower bent moving parallel to the butter table 1, but a sufficient distance away to clear the slab of butter. These chains are in duplicate, one each side of the machine, and preferably beyond the edge of the butter slab, so that in my preferred form there is no contact, or chance of contact by the chains with the butter, but supported by each link of the chain is a guide for the end of a butter cutting knife.

In Fig. III several links of the chain 10 are shown on an enlarged scale with several of the series of knives 11, the section being taken in the direction of movement and between the drive chains on the two sides of the mechanism. From the two last figures the structure will be understood as having each of the series of knives clamped at the top in a stiff bar 12, on which are end rollers 13 which move in a guideway, such as a channel section 14. This guideway on its upper side 14ª may be straight, but on its lower side it is inclined on the approach side of the knives, so as to force them by the guide roller to gradually approach the butter slab, with the guide 14 constituting a knife feed cam 15, due to the shape of the guide 14 to provide for the approach of the knives as they move forward with the butter slab, and then with the upward inclination of the cam channel at 14ᵇ they retract or raise each knife clear of the butter slab.

Each knife has each end supported in a guide 16, which is a slotted member attached to each link 10ª of the chain on one side and on the inside of the chain on the other side of the mechanism. Thus the slotted members on opposite sides of the mechanism, on the inside of the chains form a guide to control the vertical movement of each blade for approach and cutting of the butter slab, and then to permit its retracting, all while in a vertical position, that is normal to the butter slab surface in order that each knife may make a clean cut. The timing of the approach of the knives and the extent of their penetration in the butter slab is controlled by rollers 13 moving in the guide plate, and particularly the cam portion thereof 15. As the chains 10 are moved by the sprockets on shaft f, the butter slab will move in unison with all of the other mechanism, and particularly the printing roll which feeds the butter slab along the table 1. Thus by any suitable adjustment the butter slab with its imprint of butter chips when reaching the transverse cutting knife mechanism, has the knives so adjusted that they will accurately register with the transverse indentations on the slab. Then the continuous operation of the machine assures the transverse knives always severing the butter slab to accurately cut the chips to size. The spacing of the knives 11 is always definitely controlled by the chain and slotted members 16, and corresponds accurately to the width or length, as desired, of the butter chip as it is creased by the printing roll 3.

The knives 11 are preferably so adjusted that they cut almost through the butter, but they may touch the paper, so that all the butter chips are practically severed from each other. But in order to have a slab of chips of the right size for the trade, and have it delivered from the machine complete without further cutting operation, I provide that one of the transverse knives, such as 11ª, is a little broader, that is cuts deeper than the other knives 11. Knife 11ª cuts through the butter and through the paper, thereby severing a complete slab of butter chips on a section of the paper for, say half pound units, and when it leaves the machine it is ready to have the marginal paper folded over the top of the butter chips, and this can be done by automatic machinery, or by hand, as desired. In order to support the printed slab the paper 4 moves directly under the tranverse cutting mechanism over an endless belt 29, driven by the shaft e, and therefore running at the same speed as the knives move. This endless belt may be formed of suitable slats linked together so that they will turn on the rolls, but will form a level flat base directly under the paper where the knives sever the butter slab, and such slats as 21 may be separated at intervals where the paper cutting knife 11ª engages, so that the cutting of the knife will make a clean cut of the paper. To still further assure the clean cut of the knives and prevent their sticking to the butter, I may put a housing or casing 22 over the knives as they pass around the top side of the cutting mechanism, and pass warm air through the casing to keep the knives at the desired temperature, or I may provide electrical heating devices in the casing or adjacent the knives, for the same ultimate purpose.

It will thus be seen that I provide a machine in which a continuous movement of butter slab imprints the chip and cuts longitudinally, and then severs the slab transversely as to chips and also as to a unit finished product, while the motion of the product is continuous and is delivered at the end of the machine, ready for delivery in the market. By this continuous operation the finished market product, without being touched by hand and at a speed greatly in excess of machines heretofore used, is delivered with uniformity and at far greater speed, and therefore represents economy in operation and a great utility in the art.

While I have herein illustrated and specifically described one form of construction which is embodied with most advantageous results in operation, many variations may be made with respect to the mechanism and dimensions, the form of knives and other features, without departing from my invention, but what I claim and desire to secure by Letters Patent is:

1. A butter chip machine having means for continuous feed of a sheet butter slab and a paper base, comprising a uniformly moving series of knives to form tranverse cuts in said slab, driving means for continuously moving said knives in unison with the movement of a butter slab and its supporting paper base, and a cam support controlling the projection of the knives with respect to the butter slab, whereby they will gradually approach the butter and cut substantially through the slab but not the paper and having at intervals deeper cutting knives to cut the butter and penetrate the paper base and then retreat without change of angle with respect to the butter slab out of contact with the butter.

2. A butter machine having a coordinated printing roll and longitudinal cutting knives and transverse cutting knives, adapted to automatically form butter chips on a paper base with a superposed butter slab, all actuated synchronously with said paper base and the mechanism to feed said paper base, means to feed the same under the butter slab as it moves through the machine, a series of knives for the transverse cutting in which the majority cut the butter and stop at the paper, and a predetermined number of deeper cutting knives at intervals penetrate the butter and the paper, thereby severing a predetermined section of print butter with its section of paper base.

3. A butter chip machine for automatically forming butter chips from slabs of butter on a paper base, comprising means for imprinting the surface of a butter slab with a predetermined series of chip impressions and recessed lines demarcating the chips, means to feed a paper base under the butter slab to move therewith uniformly, transverse cutting members supported adjacent the top surface and to move uniformly with the butter slab, means for driving the slab and the cutting means in unison, coordinated mechanism actuated with the feed of the butter slab controlling the movement of the cutting members into and out of the butter slab to substantially sever the slab transversely, and a periodic number of cutting members adapted to penetrate the butter and the paper base at predetermined sections, whereby the continuous feed of a butter slab is imprinted and indented and sections of butter and paper are severed, each section retaining a predetermined number of butter chips partially severed from each other but held together on the paper base.

4. In a butter chip machine for automatically forming chips from a slab of butter on a paper base, comprising means to supply and feed a paper base under the butter slab, means to feed both butter and paper base uniformly, a top surface imprinting roll, transverse cutting members supported to move uniformly with the butter slab, means to cause said cutting members to penetrate the butter slab a predetermined extent and to retract therefrom, and periodic cutting members adapted to penetrate the butter slab and the paper base and to retract therefrom out of contact before the sections of butter slab leave the machine.

5. In a machine for automatically forming butter chips from a slab of butter on a paper base, means for uniformly moving the paper base under a butter slab continuously in one direction, a transverse cutting mechanism including a plurality of transverse cutting members adapted for uniform cutting depth with predetermined members at intervals having a greater cutting depth, a drive chain or the like moving said cutting members uniformly with the butter slab, guides for said cutting members to control their cutting reciprocations in a path normal to the butter slab, and means adjacent said chain controlling the depth of cut of the cutting members including a cam control, whereby uniform motion in one direction projects the cutting members gradually into engagement with the under-moving butter slab to an extent of penetration, with a predetermined number of the series of cutting members being so controlled as to penetrate both the butter and the underlying paper base.

6. A machine for automatically forming butter chips and delivering the same in sections of butter slab in chip form held to a paper base, including in a series of transverse cutting members adapted to partially separate the butter chip impressions, guides for said cutting members maintaining the same during cutting movement all in parallel motion normal to the surface of a synchronously-moving butter slab, and a predetermined number of cutting members adapted to a deeper cut than the other members, whereby a section of butter chips with its paper base is automatically severed, and the cutting members retracted from the surface of the butter before any change of angle takes place in the reciprocating movement of the cutting members.

7. In an automatic butter-chip-forming machine, means for moving and reciprocating a series of transverse cutting members, a juxtaposed movable base moving in unison with the cutting members and adapted to support a paper base, means to guide the cutting members in parallel reciprocation during their cutting action, a predetermined number of cutting members adapted for deeper cutting than the intervening cutting members, and an aperture in the moving base synchronized with each of the deeper cutting members to permit the complete severing at intervals of the butter slab with its paper base.

CARL ROTH.